UNITED STATES PATENT OFFICE.

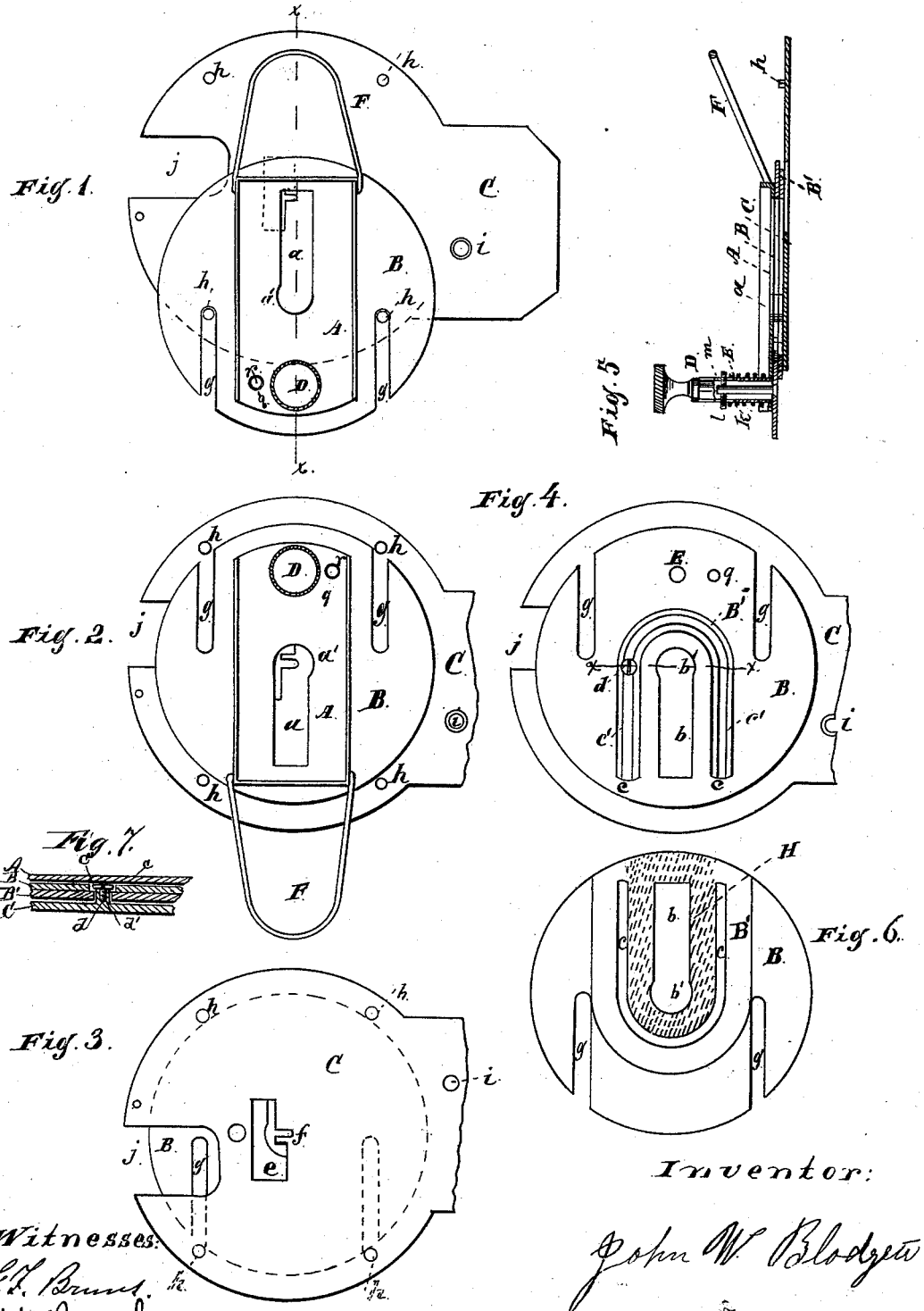

JOHN W. BLODGETT, OF CHICAGO, ILLINOIS.

IMPROVEMENT IN BUTTON-HOLE ATTACHMENTS FOR SEWING-MACHINES.

Specification forming part of Letters Patent No. 222,858, dated December 23, 1879; application filed March 31, 1879.

*To all whom it may concern:*

Be it known that I, JOHN W. BLODGETT, of Chicago, Cook county, State of Illinois, have invented a new and useful Improvement in Button-Hole Attachments for Sewing-Machines, of which the following is a full description, reference being had to the accompanying drawings, in which—

Figure 1 is a top or plan view, showing the attachment or device in position to commence work; Fig. 2, a top or plan view, showing the attachment in position when one side and the eye have been worked; Fig. 3, a bottom view, partly broken away; Fig. 4, a top or plan view of the feed or carrying plate; Fig. 5, a vertical cross-section on line $x\ x$ of Fig. 1; Fig. 6, a bottom view of the feed-plate, showing the soft-metal facing. Fig. 7 is a sectional view in the line $x\ x$, Fig. 4, showing the construction of the threaded post.

My invention relates to improvements in button-hole attachments for sewing-machines; and it consists in certain improvements therein, as will be hereinafter more fully set forth, and pointed out in the claims.

In the drawings, A represents the clamp-plate; B, the feed-plate; C, the base-plate; D, the attaching-socket of A; E, the post for the socket D; F, the handle; H, the soft-metal facing; $a$, the button-hole opening in the plate A, and $a'$ its circular end; $b$, the button-hole opening in the plate B, and $b'$ its circular end; $c$, the groove in the plate B. $d$ is a screw engaging in the socket of a hollow threaded post, $d'$, (see Fig. 7,) attached to the plate C, said screw having its head bearing against the ledge $c'$ in the plate B, and its body passing through the groove $c$ in said plate; $e$, the opening in the plate C for the feed of the machine; $f$, the opening in the plate C for the passage of the needle; $g$, the guide-slots in plate B; $h$, the pins or studs for the slots $g$, also serving as stops; $i$, the hole for the set-screw which attaches the device to the bed-plate of the machine; $j$, the opening in the base-plate C for removing the shuttle; $k$, the spring for holding the plate A down; $l$, the pin with which the upper end of the spring $k$ comes in contact; $m$, the slots in the socket D for allowing vertical play; $q$, the hole in the plate A to receive the attaching-pin; $r$, the attaching-pin.

The plates A B C may be made from sheet-brass or other suitable material, which is to be cut so as to give the shape required for the different plates. The plate A is to be cut rectangular or other form which will furnish a sufficient bearing-surface to press and hold the material against the feed-plate. The feed-plate B is to be cut circular, for the purpose of turning or revolving it, and of a sufficient size to support the material and afford a firm bearing in use; and the plate C, as shown, is to be cut so as to have a circular portion for the plate B, and a little larger in diameter than said plate B, with a projecting portion, by which it is attached to the bed-plate of the machine; but it may be cut in any other form suitable for such purposes.

The plate A has a portion cut out, so as to leave an opening with a straight portion, $a$, and a circular portion, $a'$, and a similar opening, $b\ b'$, is formed in the plate B, which openings $a\ a'$ and $b\ b'$ coincide when the two plates are in position.

One end of the plate A is connected with the plate B by the socket D, which is attached to the plate A, and receives the post E, attached to the plate B; and to prevent the independent turning of the plate A it is locked by the pin $r$ on the plate B, which enters the hole $q$ in plate A.

A coil-spring, $k$, is located around the socket D, between the plate A and the pin $l$ in the upper end of the post E, the ends of which pin project into the slots $m$ in the sides of the socket D, which makes the connection between the plates A B a yielding one vertically, and causes the plate A to act as a clamp to hold the material. The other end of the plate A has a suitable handle, F, attached thereto, and is left free to allow the material to be inserted.

Beneath the center of the plate B is a secondary or stiffening plate, B′, having an opening corresponding to $b\ b'$, and in both plates, around the opening $b\ b'$, is a groove having a U shape, as shown in Figs. 4 and 6. The groove $c$ in the plate B is somewhat wider than the corresponding groove in the plate B′, so as to leave the edges of the plate B' projecting, and forming a ledge, c'. The groove in the plate B' receives a screw, d, passing into a threaded post on the plate C, and the plate B is attached to the plate C by means of the screw d, with its head resting on the ledge c' and located in the groove c.

In the plate B, on each side of the post E, are cut slots g, of a sufficient depth to allow the plate to slide the required distance to work the button-hole, and on the plate C, in line with the edge of the plate B when it is in position for turning, are studs or pins h, so arranged and located as to enter the slots g when the plate B is reciprocated, and form guides therefor, and also to act as stops to prevent the plate B from being carried beyond the point for turning.

The plate C has an opening, e, for the feed of the machine, and side slot, f, for the passage of the needle, and the plate B is so located that the feed of the machine will strike that portion of the plate B' between the opening b b' and the U-shaped slot, which portion is faced with solder or some other soft material, H, so as to insure the moving of the plate B by the feed and prevent the dulling of the feed in use.

The plate C is attached to the machine so as to bring the opening e over the feed and hole or slot f in line with the needle.

The material is placed between the plates A B, so that the button-hole slit will have its sides parallel with the sides of the opening a and its eye or base in the circle a'.

The plate B is adjusted so as to commence work at the end of the slit opposite the eye or base, which adjustment leaves the plate B at the edge, having the slots g projecting over the edge of the plate C, in which position the studs or pins h h will be in the slots g, and the stud d in one side of the groove c.

The feed of the machine, as it strikes the facing H, will give the plate B a movement in a straight line until its edge, which has no slots, strikes the pins h, when the plate is rotated half around, which brings the slots g in line with the pins h on the opposite side of the plate C, so that it can move in a straight line.

The sides of the button-hole will be worked when the plate B is moving in a straight line, and its eye or base when it is being turned. After the button-hole is finished the plate B is again set in the position shown in Fig. 1, ready for the next operation.

In making eyelets only the plate B is made to turn entirely around within the pins h, which can be done by removing the screw d, so that it will not engage the groove c.

A spring might be used in place of the adjustable head n for holding the cloth down at the needle.

In revolving the plate the hand of the operator may be used to aid the feed.

What I claim as new, and desire to secure by Letters Patent, is—

1. The combination, with a base-plate adapted to be secured to the bed-plate of a sewing-machine, and provided with the feed-opening e and needle-opening f, of a slotted clamping-plate provided with a handle and a slotted feed-plate, said clamping and feed plates being secured to each other by an elastic connection at their ends, and adapted to be reciprocated and partly rotated by the feeding devices of a sewing-machine, substantially as described, and for the purpose set forth.

2. The base-plate C, adapted to be attached to the bed-plate of a sewing-machine, and provided with the feed-opening e and needle-opening f, in combination with the feed-plate B, adapted to be reciprocated and partly rotated by the feeding devices of a sewing-machine, and the clamping-plate A, secured by an elastic connection to the feed-plate B, substantially as described, and for the purpose set forth.

3. In a button-hole attachment for sewing-machines, the combination of the feed-plate B, provided with slots g and groove c, and the plate C, having the studs h, a threaded post, d', and screw d, substantially as described, and for the purpose set forth.

4. The feed-plate B, provided with the post E and pin r, and clamping-plate A, provided with the socket D and hole q, in combination with the coil-spring k, for connecting the plates A B, so as to allow the material to be inserted between them, substantially as specified.

5. A sewing-machine button-hole attachment consisting of the base-plate C, provided with openings e f and pins or stops h, feed-plate B, provided with the groove c, slots g, and opening b b', and clamp-plate provided with the opening a a', all substantially as and for the purposes specified.

JOHN W. BLODGETT.

Witnesses:
O. W. BOND,
F. F. BRUNS.